(12) United States Patent
Adams

(10) Patent No.: US 10,523,808 B2
(45) Date of Patent: Dec. 31, 2019

(54) ECHO CANCELLATION FOR A COMMUNICATION DEVICE

(71) Applicant: Sorenson IP Holdings, LLC, Salt Lake City, UT (US)

(72) Inventor: Mark Adams, Lehi, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 305 days.

(21) Appl. No.: 15/331,697

(22) Filed: Oct. 21, 2016

(65) Prior Publication Data

US 2017/0041458 A1  Feb. 9, 2017

Related U.S. Application Data

(60) Continuation of application No. 14/938,811, filed on Nov. 11, 2015, now Pat. No. 9,503,569, which is a division of application No. 14/101,158, filed on Dec. 9, 2013, now Pat. No. 9,191,493.

(51) Int. Cl.
| | |
|---|---|
| *H04M 9/08* | (2006.01) |
| *H04M 3/00* | (2006.01) |
| *H04M 3/22* | (2006.01) |
| *H04B 3/23* | (2006.01) |
| *H04R 3/00* | (2006.01) |
| *H04R 3/02* | (2006.01) |
| *H04M 1/247* | (2006.01) |

(52) U.S. Cl.
CPC .............. *H04M 3/002* (2013.01); *H04B 3/23* (2013.01); *H04B 3/234* (2013.01); *H04M 3/2236* (2013.01); *H04R 3/002* (2013.01); *H04R 3/02* (2013.01); *H04M 1/2475* (2013.01)

(58) Field of Classification Search
CPC ...................................................... H04M 3/002
USPC ........................................ 379/406.01, 406.05
See application file for complete search history.

(56) References Cited

U.S. PATENT DOCUMENTS

| | | |
|---|---|---|
| 4,777,469 A | 10/1988 | Engelke et al. |
| 4,959,847 A | 9/1990 | Engelke et al. |
| 5,081,673 A | 1/1992 | Engelke et al. |
| 5,305,307 A | 4/1994 | Chu |
| 5,325,417 A | 6/1994 | Engelke et al. |
| 5,327,479 A | 7/1994 | Engelke et al. |
| 5,351,288 A | 9/1994 | Engelke et al. |
| 5,365,583 A | 11/1994 | Huang et al. |

(Continued)

*Primary Examiner* — Md S Elahee
(74) *Attorney, Agent, or Firm* — Maschoff Brennan

(57) ABSTRACT

Enabling and disabling the updating of an adaptive filter for echo cancellation of a communication device is discussed. In some embodiments, an echo canceler in a communication device may include an adaptive filter enabled to update responsive to a determination that a first condition is satisfied that there is no double talk detected on the communication device, and a determination that a second condition is satisfied based, at least in part, on a performance characteristic. The adaptive filter may be disabled from updating responsive to at least one of the first condition and the second condition not being satisfied. Described is disabling the adaptive filter from updating responsive to detecting a performance characteristic of the adaptive filter to fail to meet a condition indicating that the adaptive filter is diverging. The condition may be independent of whether double-talk is determined to be present on the communication device.

20 Claims, 6 Drawing Sheets

(56) References Cited

U.S. PATENT DOCUMENTS

| | | |
|---|---|---|
| 5,432,837 A | 7/1995 | Engelke et al. |
| D364,865 S | 12/1995 | Engelke et al. |
| 5,535,194 A | 7/1996 | Ashley et al. |
| 5,577,097 A | 11/1996 | Meek |
| 5,581,593 A | 12/1996 | Engelke et al. |
| 5,604,786 A | 2/1997 | Engelke et al. |
| 5,687,222 A | 11/1997 | McLaughlin et al. |
| 5,724,405 A | 3/1998 | Engelke et al. |
| 5,809,425 A | 9/1998 | Colwell et al. |
| 5,909,482 A | 6/1999 | Engelke |
| 5,974,116 A | 10/1999 | Engelke et al. |
| 5,978,654 A | 11/1999 | Colwell et al. |
| 6,075,841 A | 6/2000 | Engelke et al. |
| 6,075,842 A | 6/2000 | Engelke et al. |
| 6,233,314 B1 | 5/2001 | Engelke |
| 6,266,409 B1 | 7/2001 | Laberteaux |
| 6,307,921 B1 | 10/2001 | Engelke et al. |
| 6,434,110 B1 | 8/2002 | Hernkumar |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 | 8/2003 | Engelke et al. |
| 6,748,053 B2 | 6/2004 | Engelke et al. |
| 6,882,707 B2 | 4/2005 | Engelke et al. |
| 6,885,731 B2 | 4/2005 | Engelke et al. |
| 6,934,366 B2 | 8/2005 | Engelke et al. |
| 7,003,082 B2 | 2/2006 | Engelke et al. |
| 7,006,604 B2 | 2/2006 | Engelke |
| 7,164,753 B2 | 1/2007 | Engelke et al. |
| 7,319,740 B2 | 1/2008 | Engelke et al. |
| 7,408,891 B2 | 8/2008 | Popovic |
| 7,555,104 B2 | 6/2009 | Engelke |
| 7,660,398 B2 | 2/2010 | Engelke et al. |
| 7,881,441 B2 | 2/2011 | Engelke et al. |
| 8,213,578 B2 | 7/2012 | Engelke et al. |
| 8,254,588 B2 | 8/2012 | Karthik et al. |
| 8,295,475 B2 | 10/2012 | Li et al. |
| 8,369,512 B2 | 2/2013 | Le Tourneur |
| 8,379,801 B2 | 2/2013 | Romriell et al. |
| 8,411,847 B2 | 4/2013 | Burns et al. |
| 8,416,925 B2 | 4/2013 | Engelke et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 9,350,857 B1 | 5/2016 | Engelke et al. |
| 2002/0085685 A1 | 7/2002 | Engelke et al. |
| 2004/0120511 A1* | 6/2004 | Beaucoup ............ H04M 9/082 379/406.05 |
| 2005/0058277 A1 | 3/2005 | Barron et al. |
| 2005/0286714 A1 | 12/2005 | Tokuda |
| 2006/0233353 A1 | 10/2006 | Beaucoup et al. |
| 2008/0187108 A1 | 8/2008 | Engelke et al. |
| 2009/0028355 A1 | 1/2009 | Ishiguro |
| 2009/0116638 A1 | 5/2009 | Gough |
| 2009/0257679 A1* | 10/2009 | Hogasten ................ G06T 5/50 382/275 |
| 2009/0279686 A1 | 11/2009 | Tan |
| 2011/0170672 A1 | 7/2011 | Engelke et al. |
| 2012/0250837 A1 | 10/2012 | Engelke et al. |

* cited by examiner

ECHO CANCELLATION FOR A COMMUNICATION DEVICE

CROSS REFERENCE TO RELATED APPLICATION

This application is a continuation of U.S. patent application Ser. No. 14/938,811, filed Nov. 11, 2015, which is a divisional of U.S. patent application Ser. No. 14/101,158, filed Dec. 9, 2013, U.S. Pat. No. 9,191,493, issued Nov. 17, 2015, the disclosures of which are hereby incorporated herein in their entirety by this reference.

TECHNICAL FIELD

Embodiments of the disclosure relate to echo cancellation in communication devices.

BACKGROUND

Communication systems, such as conventional telephone communication systems, provide audio communication between two or more users during a communication session. Each user may communicate with each other using a communication device having a speaker and a microphone. During a communication session, the microphone of the communication device may experience echo (e.g., line echo, hybrid echo, acoustic echo). The communication device may send a signal corresponding to the echo from the speaker to a far-end user's communication device. If the signal transmitted by the communication device to the far-end user includes acoustical energy from the speaker, the far-end user may hear an "echo" of his or her own utterances. Conventional audio echo cancellation (AEC) techniques are designed to predict and remove the echo from an electrical signal generated by the microphone. In a line echo situation, the near end user's echo is being canceled.

FIG. 1 is a simplified block diagram of a conventional communication device 100. The communication device 100 includes a speaker 102 and a microphone 104 that are operably coupled with a double-talk detector 106 and an adaptive filter 108. In operation, the speaker 102 receives a speaker signal SPKR including audio from a far-end user and converts the speaker signal SPKR to sound waves for the near-end user to hear. The microphone 104 generates a microphone signal MIC that is based on the sound waves picked up by the microphone 104. The sound waves picked up by the microphone 104 may include the utterances from the near-end user as well as an echo of the speaker signal SPKR.

The adaptive filter 108 may include an echo predictor 110 that is configured to calculate a predicted echo ECHO'. The adaptive filter 108 may subtract the predicted echo ECHO' from the microphone signal MIC to generate a filtered microphone signal FILT that has at least a portion of the echo removed. Ideally, the filtered microphone signal FILT has the full echo from the speaker signal SPKR removed such that the filtered microphone signal FILT includes only the voice of the near-end user, which may be transmitted to the far-end communication device without echo. The filtered microphone signal FILT may sometimes be referred to as an "error signal" during periods of speech or non-speech because it is the residual energy after cancelation.

The adaptive filter 108 may be configured to model the microphone echo signal ECHO to generate the predicted echo ECHO', which may be subtracted from the microphone signal MIC. The adaptive filter 108 may monitor the speaker signal SPKR and the filtered microphone signal FILT to update the adaptive filter 108 to reduce the error from the predicted echo ECHO'. The adaptive filter 108 may continue to remove the predicted echo ECHO' from the microphone signal MIC, and the filtered microphone signal FILT may be sent to the far-end user.

During a communication session, there may be a "double-talk" situation, in which the near-end user and the far-end user both speak at the same time. If the adaptive filter 108 updates during double-talk, the adaptive filter 108 may use the voice of the near-end user to model the microphone echo, which may result in the adaptive filter 108 may diverging predicting an inaccurate echo. Such divergence may, in some situations, increase the amount of echo heard by the far-end user or otherwise contribute to an unintelligible signal heard by the far-end user.

The double-talk detector 106 may be configured to detect double-talk and prevent the adaptive filter 108 from updating during double-talk. For example, the double-talk detector 106 may send a double-talk signal DT to the adaptive filter 108, indicating that double-talk has been detected. During double-talk the adaptive filter 108 may not update. Conventional double-talk detectors 106 may fail to detect double-talk according to some probability of miss. As a result, the adaptive filter 108 may, at times, update during double-talk, which may cause the adaptive filter 108 to diverge. To reduce the effects of this probability of miss, conventional double-talk detectors 106 may be configured to assert the double-talk signal DT for a predetermined amount of time (e.g., 40 ms) after detecting double-talk. This conventional approach may result in some improvements in reducing instances of updating the adaptive filter 108 during double-talk; however, the inventor has appreciated that further improvements may still be desirable.

BRIEF SUMMARY

In some embodiments, the disclosure comprises a method of operating a communication device. The method comprises determining whether there is double-talk on a communication device, monitoring a performance characteristic of the communication device. The method further comprises enabling an adaptive filter of an echo canceler to update responsive to: a determination that a first condition is satisfied that there is no double talk detected on the communication device; and a determination that a second condition is satisfied based, at least in part, on the performance characteristic. The method further comprises disabling the adaptive filter of the echo canceler from updating responsive to at least one of the first condition and the second condition not being satisfied.

In some embodiments, the disclosure comprises a communication device. The communication device comprises an electronic circuit. The electronic circuit comprises an adaptive filter, a double-talk detector configured monitor a microphone signal and a speaker signal for double talk, and control logic. The control logic is configured to enable the adaptive filter to update responsive to: a first condition being satisfied that double-talk is not detected; and a second condition being satisfied that is based, at least in part, on a performance characteristic of the adaptive filter.

In some embodiments, the disclosure comprises a method of operating a communication device. The method comprises disabling an adaptive filter from updating responsive to detecting, with a control logic a performance characteristic of the adaptive filter failing to meet a condition indicating that the adaptive filter is diverging, the condition being independent of whether double-talk is determined to be present on the communication device.

DETAILED DESCRIPTION

Figure 1:
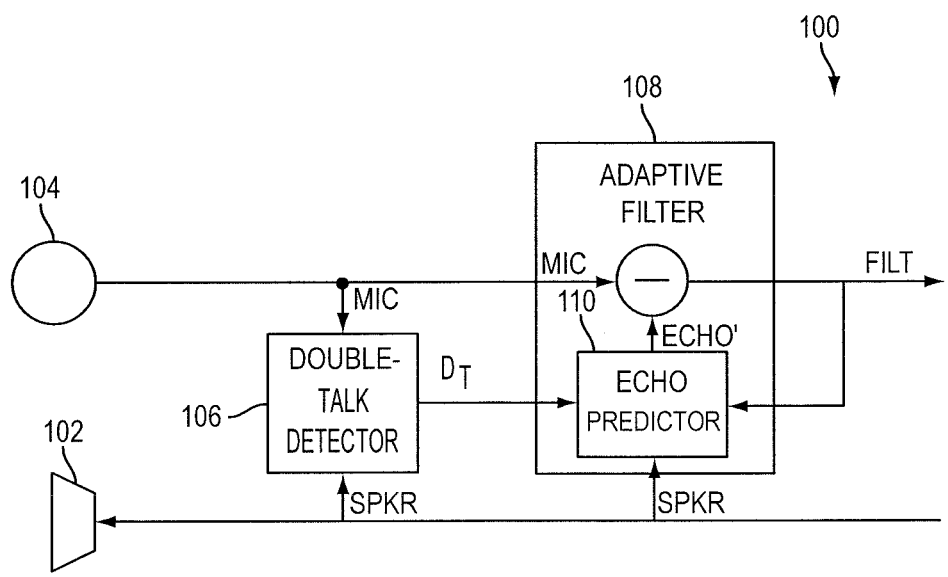
FIG. 1 is a simplified block diagram of a conventional communication device.

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware, software, or a combination thereof, depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the disclosure include systems, methods, and devices for enabling and disabling updating an adaptive filter for echo cancellation of a communication device. An echo canceler may include an adaptive filter that may be enabled to update responsive to a determination that a first condition is satisfied that there is no double talk detected on the communication device, and a determination that a second condition is satisfied based, at least in part, on the performance characteristic. The adaptive filter may be disabled from updating responsive to at least one of the first condition and the second condition not being satisfied. Disabling the adaptive filter from updating may be responsive to detecting a performance characteristic of the adaptive filter to fail to meet a condition indicating that the adaptive filter is diverging. The condition to be met may be independent of whether double-talk is determined to be present on the communication device. In other words, if the condition is not met, the adaptive filter may be disabled from updating even if double-talk has not been detected. As a result, the adaptive filter may update more often at times of converging rather than at time of diverging.

The terms "converge," "converging," "converges," "converged," and other forms of the base word "converge" refer to a state of the adaptive filter in which the error is reducing (i.e., approaching zero error). The terms "diverge," "diverging," "diverges," "diverged," and other forms of the base word "diverge" refer to a state of the adaptive filter in which the error is increasing (i.e., moving away from zero).

Embodiments of the disclosure span a variety of functions in a variety of applications. Embodiments of the disclosure may be described herein with reference to communication devices for the hearing impaired. By way of non-limiting example, the communication device may include any of a text-captioned communication device, a video communication device, an amplified audio communication device, and combinations thereof. It should be noted, however, that embodiments of the disclosure may include any application or environment where echo cancelation in audio signals is desirable. For example, it is contemplated that embodiments of the disclosure may include communication devices for hearing-capable users, such as speaker phone devices, telephones, cellular phones, personal computer, a notebook computer, a tablet computer, a smart phone, a conference call device, and other suitable communication devices.

Figure 2:
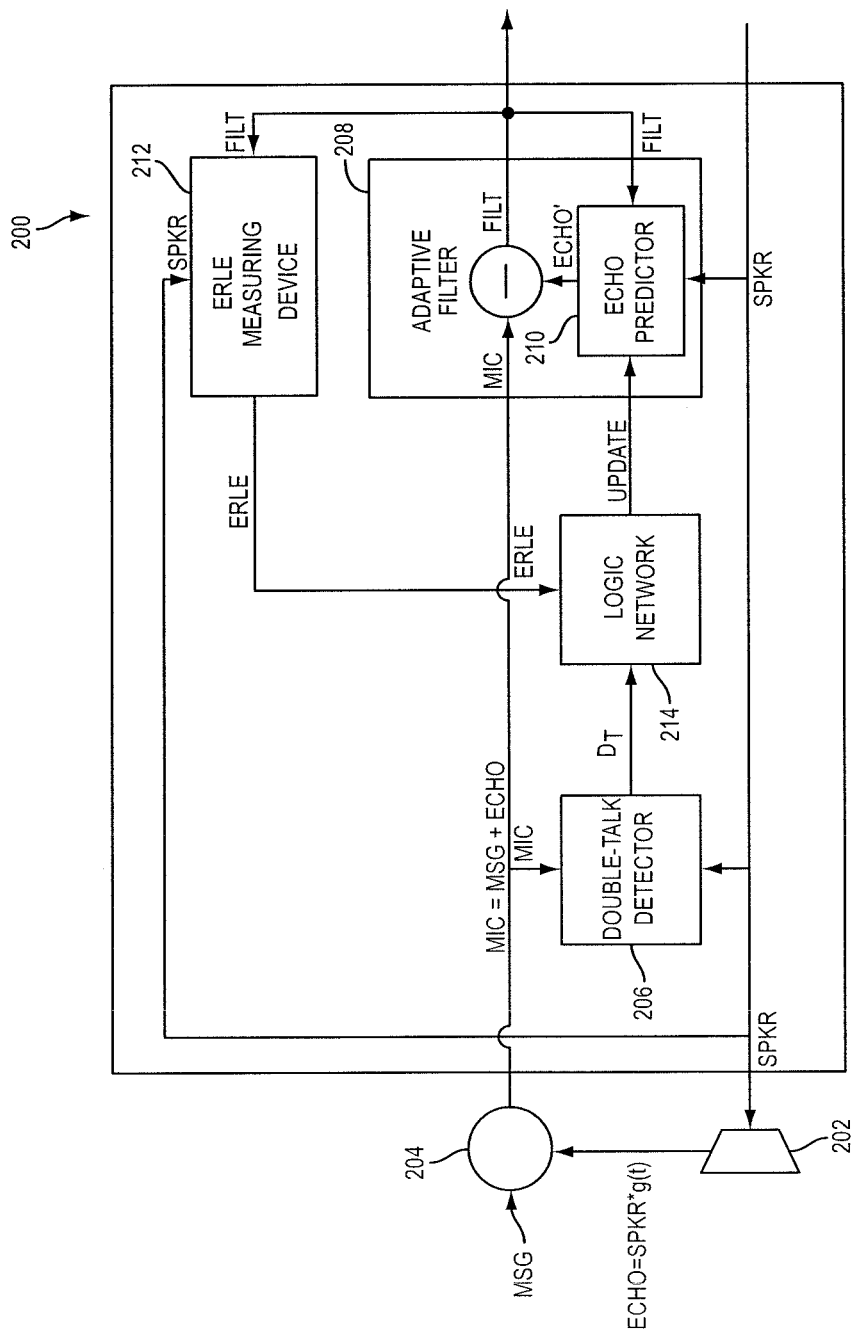
FIG. 2 a simplified block diagram of a communication device.

FIG. 2 is a simplified block diagram of a communication device 200 according to an embodiment of the disclosure. The communication device 200 may include a speaker 202, a microphone 204, and an electronic circuit 216. The electronic circuit 216 may include a double-talk detector 206, an adaptive filter 208, an echo return loss enhancement (ERLE) measuring device 212, and a control logic 214. Each of the speaker 202, the double-talk detector 206, the adaptive filter 208, and the ERLE measuring device 212 may be configured to receive a speaker signal SPKR. The speaker signal SPKR may include an audio signal from the far-end to be converted to sound by the speaker 202. Also, each of the double-talk detector 206, the adaptive filter 208, and the ERLE measuring device 212 may be configured to receive a microphone signal MIC. The microphone signal MIC may include the audio signal from the near-end that is captured by the microphone 204 to be sent to the far-end.

The speaker 202 may include an audio output device configured to convert electrical signals to acoustic energy. By way of non-limiting example, the speaker 202 may include a dynamic loudspeaker, a multiple loudspeaker system, a coaxial driver, and other suitable electro-acoustic transducers. In some embodiments, the speaker 202 may be implemented in a common enclosure as one or more other components of the communication device 200, such as, for example, in a speakerphone device. In some embodiments, the speaker 202 may be implemented externally to the other components of the communication device 200. By way of non-limiting example, the speaker 202 may be part of an audio system incorporated with a video phone. Also by way of non-limiting example, the speaker 202 may include an amplified speaker in a communication device for the hearing impaired. The speaker 202 may be configured to receive a speaker signal SPKR that includes an audio signal from one or more other communication devices 200. The speaker 202 may receive the speaker signal SPKR, which may be communicated through a network 630 by another communication device 620, as discussed in more detail with respect to FIG. 6.

The microphone 204 may be an audio input device configured to convert acoustic energy to electrical signals. By way of non-limiting example, the microphone 204 may include any of a dynamic microphone, a condenser microphone, a piezoelectric device, a light modulation device, and other suitable audio input devices. Similar to the speaker 202, the microphone 204 may be implemented either external to, or together with, the other components of the communication device 200. The microphone 204 may be configured to generate a microphone signal MIC corresponding to acoustic energy received by the microphone 204. By way of non-limiting example, the microphone 204 may be configured to generate a microphone signal corresponding to acoustic energy resulting from a user speaking into the microphone.

In some embodiments, the microphone 204 may be positioned in relatively close proximity to the speaker 202. In operation, the microphone 204 may convert acoustic energy to the microphone signal MIC. The acoustic energy captured by the microphone 204 may include sound created by the near-end user as well as by the sound created by the speaker 202 (e.g., an echo). As a result, the microphone signal MIC may include a message component MSG from the user speaking, and an echo component ECHO from the speaker 202:

$$\text{MIC=MSG+ECHO.} \quad (1)$$

The echo component ECHO of the microphone signal MIC may be approximated by a convolution between the speaker signal SPKR and a transfer function g(t).

$$\text{ECHO=SPKR}*g(t). \quad (2)$$

The transfer function g(t) may change over time as the acoustic properties of the surrounding environment of the speaker 202 may change. For example, the acoustic properties of the surrounding environment may change when objects near the speaker 202 or microphone 204 move, when temperature changes, etc. The echo may include line echo, hybrid echo, acoustic echo, and combinations thereof.

The adaptive filter 208 may be configured to filter the microphone signal MIC to remove the echo—generating the filtered microphone signal FILT. For example, the adaptive filter 208 may be configured receive the speaker signal SPKR and the microphone signal MIC, and output a filtered microphone signal FILT that has had a predicted echo signal ECHO' removed therefrom. Thus, the adaptive filter 208 may perform echo cancellation for the microphone signal MIC.

The adaptive filter 208 may include an echo predictor 210 configured to generate the predicted echo signal ECHO'. In some embodiments, the echo predictor 210 may be configured to generate an estimated transfer function g'(t). The estimated transfer function g'(t) may be an estimate of the transfer function g(t). The echo predictor 210 may generate the estimated transfer function g'(t) by analyzing one or more of the microphone signal MIC, the speaker signal SPKR, and the filtered microphone signal FILT. The estimated transfer function g'(t) may be generated by using system identification techniques known in the art. By way of non-limiting example, the echo predictor 210 may generate the estimated transfer function g'(t) by performing a deconvolution of the microphone signal MIC with the speaker signal SPKR. Also by way of non-limiting example, the estimated transfer function g'(t) may be generated using any of an output error polynomial model, an autoregressive-moving-average (ARMA) model, a Box-Jenkins polynomial model, and other suitable system identification techniques.

The echo predictor 210 may generate the predicted echo signal ECHO' by convolving the speaker signal SPKR with the estimated transfer function g'(t). The adaptive filter 208 may generate the filtered microphone signal FILT by removing the predicted echo signal ECHO' from the microphone signal MIC. The resulting filtered microphone signal FILT may be:

$$\text{FILT=MIC-ECHO'.} \quad (3)$$

Combining equations (1) and (3), yields:

$$\text{FILT=MSG+ECHO-ECHO'.} \quad (4)$$

When the predicted echo signal ECHO' is approximately equal to the echo component ECHO of the microphone signal MIC, the filtered microphone signal FILT is approximately equal to the message component MSG of the microphone signal MIC. In other words, the better the echo predictor 210 predicts the predicted echo signal ECHO', the better the filtered microphone signal FILT approximates the message component MSG of the microphone signal MIC.

Not only may the adaptive filter 208 be configured to predict the echo signal ECHO, the adaptive filter 208 may also determine the error of that prediction, and update the filter coefficients. As the adaptive filter 208 updates, the adaptive filter 208 may converge to a solution such that the error may be reduced. The adaptive filter 208 may include, for example, any of a recursive least-squares filter, a least mean squares (LMS) filter, a finite impulse response (FIR) filter and other suitable filters.

Updating the adaptive filter 208 under different conditions may result in different outcomes. A first such condition includes a situation where the user (sometimes referred to herein as "the near-end user") of the communication device 200 is not speaking, and the other user (referred to herein as "the far-end user") of another of the communication devices 610, 620 (FIG. 6) is speaking. This first condition is referred to herein as "the far-end only condition."

In the far-end only condition, the message component MSG of the microphone signal MIC is relatively small, and the echo component ECHO of the microphone signal MIC is relatively large. Assuming that the message component MSG of the microphone signal MIC is zero, the microphone signal MIC becomes:

$$\text{MIC}=\text{ECHO}. \tag{5}$$

In such instances, it may be relatively easy to generate an accurate estimated transfer function g'(t) because the adaptive filter 208 may have access to both the speaker signal SPKR and the echo component ECHO of the microphone signal MIC. Updating the adaptive filter 208 during the far-end only condition may result in a relatively high likelihood of the adaptive filter 208 converging.

A second condition includes a situation where both the far-end user and the near-end user are speaking at substantially the same time. This second condition is referred to herein as a "double-talk condition." In the double-talk condition, both the message component MSG of the microphone signal MIC and the echo component ECHO of the microphone signal MIC are relatively large. If the adaptive filter 208 updates during the double-talk condition, the message component MSG of the microphone signal MIC may be factored into the calculation of the estimated transfer function g'(t), and may result in inaccurate predicted echo signals ECHO'. The resulting filtered microphone signal FILT may be distorted, and may sometimes include more echo than the original microphone signal MIC. Updating the adaptive filter 208 during the double-talk condition may result in a relatively high likelihood of the adaptive filter diverging.

A third condition includes a situation where the far-end speaker is not speaking. This third condition is referred to herein as "the quiet far-end condition." In the quiet far-end condition, the message component MSG of the microphone signal MIC may be relatively large when the near-end speaker is speaking, and relatively small when the near-end speaker is not speaking. The echo component ECHO of the microphone signal MIC may be relatively small. Assuming that the echo component ECHO of the microphone signal MIC is zero, the resulting microphone signal MIC is:

$$\text{MIC}=\text{MSG}. \tag{6}$$

In such instances, it may be difficult to generate an accurate estimated transfer function g'(t) because there is relatively little echo component ECHO of the microphone signal MIC. Updating the adaptive filter 208 during the quiet far-end condition may not, however, result in a relatively high likelihood of divergence because even if the estimated transfer function g'(t) is inaccurate, it may be convolved with a speaker signal SPKR of near zero-magnitude to produce a predicted echo signal ECHO' of near zero-magnitude. The resulting filtered microphone signal FILT would be substantially the same as the microphone signal MIC.

The double-talk detector 206 may be configured to receive the speaker signal SPKR and the microphone signal MIC. The double-talk detector 206 may also be configured to analyze the speaker signal SPKR and the microphone signal MIC to detect double-talk. The double-talk detector 206 may include any of a Geigel detector, a normalized cross-correlation detector, a fast normalized cross-correlation detector, and other suitable double-talk detectors. If the double-talk detector 206 detects double-talk, the double-talk detector 206 may assert a double-talk signal DT. If the double-talk detector 206 does not detect double-talk, the double-talk detector 206 may deassert the double-talk signal DT. Double-talk detectors 206 may occasionally make mistakes in their detection of double-talk. As a result, the double-talk detector 206 may sometimes deassert the double-talk signal DT during double-talk or assert the double-talk signal DT when there is no double talk detected.

As discussed above, it may be desirable for the adaptive filter 208 to not update during double-talk. Doing so may reduce divergence that may be caused by updating the adaptive filter 208 when the microphone signal MIC has a message component MSG. Thus, the adaptive filter 208 may be configured to update if there is an absence of the double talk condition. By updating when there is no double-talk condition, the message component MSG may be relatively low (e.g., close to zero), and the microphone signal MIC may essentially be equal to the echo signal ECHO. In other words, when there is an absence of the double talk condition:

$$\text{FILT} \sim \text{ECHO} - \text{ECHO}'. \tag{7}$$

As a result, the filtered microphone signal FILT may essentially be the difference between the echo signal ECHO and the predicted echo signal ECHO'. In that situation, the filtered microphone signal FILT may be ideally zero. If the filtered microphone signal FILT is not zero, the filtered microphone signal FILT may be the error signal used by the echo predictor 210 to update the coefficients of the adaptive filter 208.

The adaptive filter 208 may also be configured to update responsive to measurements of the performance of the adaptive filter 208. In other words, the adaptive filter 208 may be enabled to update based on other factors rather than being solely based on result of the double-talk detector 206. Thus, performance measurements used to enable or disable the updating of the adaptive filter 208 may be based, at least in part, on the ERLE measured by the ERLE measuring device 212.

The ERLE measuring device 212 may be configured to receive the speaker signal SPKR, the microphone signal MIC, and the filtered microphone signal FILT. The ERLE measuring device 212 may be configured to determine an ERLE of the adaptive filter 208. By way of non-limiting example, the ERLE may be:

$$\text{ERLE}=-10\ \log_{10}(|\text{FILT}|/|\text{MIC}|), \tag{8}$$

where |...| is the magnitude operator, and $\log_{10}(...)$ is the base-ten logarithm. In some embodiments, the ERLE may be calculated in terms of running averages of the magnitudes of the filtered microphone signal FILT and the microphone signal MIC. The ERLE measuring device 212 may be configured to provide the ERLE results to the control logic 214.

The control logic 214 may be configured to receive the double-talk signal DT and the ERLE and determine when the conditions have been met to enable the adaptive filter 208 to update. A first condition may include the double-talk detector 206 detecting double-talk, which may be indicated by the double-talk signal DT being asserted. A secondary condition may be based, at least in part, on analysis of performance measurements (e.g., the ERLE) of the adaptive filter 208.

For example, in one embodiment, the adaptive filter may be configured to be enabled for updating if the ERLE is above a threshold level. The threshold level may dynamically change over time. For example, the ERLE may be compared with a threshold that may increase as the current ERLE value increases a peak ERLE ($ERLE_{MAX}$). The threshold may also decay over time if a predetermined time period has elapsed without the adaptive filter updating. Thus, if a relatively long period of time has elapsed since the last update, the threshold may be reduced (e.g., by reducing the $ERLE_{MAX}$) to encourage the adaptive filter 208 to come out of its state of divergence.

In another embodiment, the adaptive filter 208 may be configured to be enabled for updating responsive if the ERLE associated with the adaptive filter 208 is increasing, and greater than a threshold level of the ERLE. In some embodiments, the threshold level may be dynamic threshold level that is based on the peak ERLE ($ERLE_{MAX}$) measured during operation less some tolerance level. $ERLE_{MAX}$ may update during operation as a new peak ERLE is measured. In some embodiments, the threshold level may be a predetermined threshold level that acts as a floor for the ERLE. In some embodiments, the ERLE may be compared with the dynamic threshold level and the predetermined threshold level such that the secondary condition may be satisfied if the ERLE is greater than either one (so long as the ERLE is still increasing). Thus, the adaptive filter 208 may be permitted to update if the double-talk detector 206 does not detect double-talk and the second conditions of the ERLE are satisfied.

As an example, if the conditions have been satisfied to enable the adaptive filter 208 to update, the control logic 214 may assert the update signal UPDATE. Thus, the control logic 214 may also be configured to analyze the double-talk signal DT and the ERLE, and assert the update signal UPDATE responsive to the double-talk signal DT not being asserted, the ERLE increasing, and the ERLE being above either a threshold as discussed above. As a result, even if the double-talk detector 206 fails to assert the double-talk signal DT during double-talk, the control logic 214 may not assert the update signal UPDATE unless the ERLE is both increasing and above the threshold.

The first threshold may be a dynamic threshold that is set at a level (e.g., 3 dB) below peak ERLE ($ERLE_{MAX}$). For example, if the peak ERLE ($ERLE_{MAX}$) is 25 dB the first threshold may be set at 22 dB if the level below the peak ERLE ($ERLE_{MAX}$) is set at 3 dB. The threshold may be reduced by a decay value (e.g., 3 dB) if a predetermined period of time has elapsed without the adaptive filter updating during a non double-talk situation. As an example, the $ERLE_{MAX}$ (e.g., 25 dB) may be reduced by the decay value (e.g., 3 dB) to have a new $ERLE_{MAX}$ (e.g., 22 dB). As a result, the threshold used may be lower (e.g., 19 dB) than in a previous iteration of monitoring the secondary conditions.

In some embodiments, different thresholds may be used. For example, the first threshold may be a dynamic threshold simply set at a value below the peak ERLE ($ERLE_{MAX}$). A second threshold may also be used. The second threshold may be a predetermined threshold that is set at a level (e.g., 18 dB) that is set as a floor for satisfactory performance of the adaptive filter 208 during echo cancellation. If the ERLE is below both of the first threshold and the second threshold, the adaptive filter 208 may be seen as being in a state of divergence such that it would be undesirable to update the adaptive filter 208 even if the double-talk detector 206 did not detect double-talk.

The initial ERLE of the adaptive filter 208 may be relatively low such that it may appear to be in a state of divergence. In order to allow for the adaptive filter 208 to begin updating in this initial state, the initial condition of the first threshold may be set lower than the second threshold so that the adaptive filter 208 may begin updating at the outset even though the ERLE may be relatively low. For example, the initial condition of the peak ERLE ($ERLE_{MAX}$) may be set at 0 dB or another relatively low value (e.g., a negative value). As the ERLE increases, the peak ERLE ($ERLE_{MAX}$) may be updated repeatedly so that the first threshold dynamically increases to a relatively higher level. Once the first threshold rises above the second threshold, the second threshold may essentially be the determining threshold for whether or not the second condition is satisfied. Thus, the first threshold may be more significant for situations when the adaptive filter 208 starts up, is reset, or otherwise begins updating from its initial conditions. In some embodiments, the communication device 200 may include a reset device that may be configured to reset one or more components of the communication device 200 to its initial conditions if the adaptive filter 208 is in a state of divergence wherein it would be preferable to reset the adaptive filter 208 rather than to allow the diverging adaptive filter 208 to continue diverging.

Figure 3:
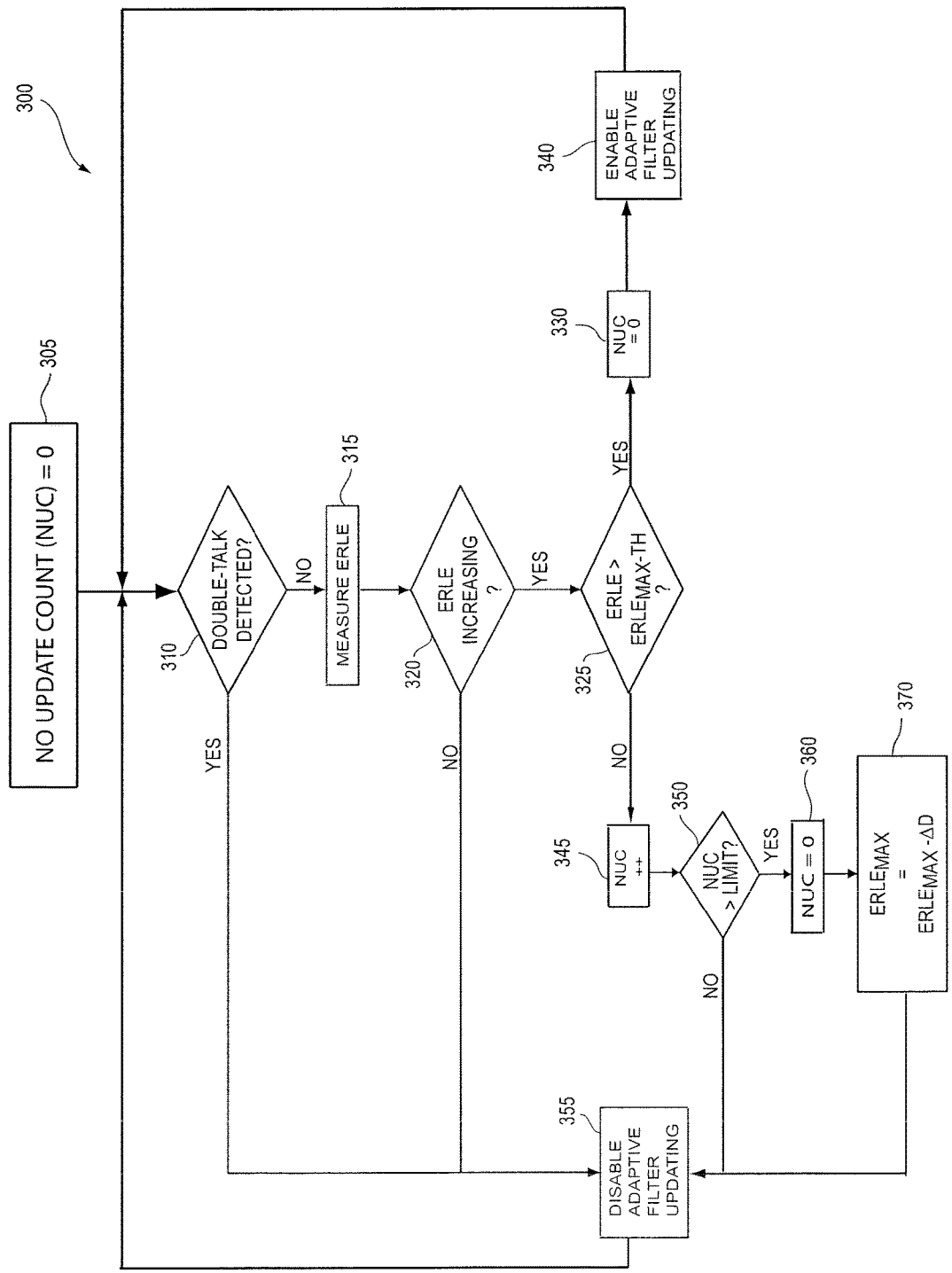
FIG. 3 is a simplified flowchart illustrating a method of operating a communication device.

FIG. 3 is a simplified flowchart 300 illustrating a method of operating a communication device 200 (FIG. 2). In particular, the method illustrates determining whether the conditions are met for enabling the adaptive filter 208 (FIG. 2) to update. As discussed above, rather than relying solely on the double-talk determination by the double-talk detector 206 (FIG. 2), additional conditions of the adaptive filter 208 may be monitored before enabling the adaptive filter to update. According to the embodiment of FIG. 3, the monitor a number of times that the secondary conditions were not satisfied during a non-double talk condition. For example, a timer may be used to count (up or down) for a predetermined amount of time (e.g., a predetermined number of counts), during which the secondary conditions may be monitored. If the secondary conditions are not met after a predetermined limit has been met between updates, the threshold used for the secondary conditions may be dynamically changed by reducing the peak ERLE by a decay constant.

At operation 305, a no update count (NUC) may be reset to an initial condition (e.g., set to 0). The NUC may indicate an amount of time that has elapsed since an update has occurred. An amount of "time" does not necessarily require that the time period be measured in standard measurements of time (e.g., seconds). Rather, an amount of time may include a number of counts that occur to indicate a number of iterations that have taken place since a prior update.

At operation 310, it may be determined if double-talk is detected. In some embodiments, the control logic 214 (FIG. 2) may receive the double-talk signal DT from the double-talk detector 206. If the double-talk detector 206 detects double-talk, the double-talk detector 206 may assert the double-talk signal DT. If the double-talk detector 206 does not detect double-talk, the double-talk detector 206 may deassert the double-talk signal DT. If the control logic 214 determines that the double-talk detector 206 detected double-talk, the updating may be disabled for the adaptive filter 208 at operation 355. For example, the control logic 214 may deassert the update signal UPDATE, which indicates that at least one condition for enabling updating the adaptive filter 208 has not been satisfied.

Returning to operation 310, if the double-talk detector 206 does not detect double-talk, the double-talk detector 206 may indicate that double-talk is not detected by deasserting the double-talk signal DT. The control logic 214 may receive the deasserted double-talk signal DT. Even if double-talk was not detected, one or more secondary conditions may still be required to be satisfied before the updating may be enabled for the adaptive filter 208.

At operation 315, the ERLE may be measured. As discussed above, the ERLE measuring device 212 may be configured to receive the speaker signal SPKR, the microphone signal MIC, and the filtered microphone signal FILT. In some embodiments, the ERLE may be determined according to equation (8). In some embodiments, the ERLE may be calculated in terms of running averages of the magnitudes of the filtered microphone signal FILT and the microphone signal MIC.

At operation 320, the control logic 214 may determine if the ERLE is increasing. In some embodiments, the control logic 214 may determine if the ERLE is increasing by monitoring the ERLE signal from measured by the ERLE measuring device 212. For example, the measured ERLE value may be compared with at least one historical ERLE value to determine whether the ERLE is increasing. The comparison may be based on the value immediately prior to the measured ERLE value, a plurality of prior ERLE values (e.g., that may indicate a trend, that may provide an averaged value, etc.)

If the control logic 214 determines that the ERLE is not increasing, the adaptive filter 208 may not be enabled for updating at operation 355 (e.g., by deasserting the update signal UPDATE). If, however, the control logic 214 determines that the ERLE is increasing, the control logic 214 may determine if the ERLE is greater than a threshold that may be set to be a tolerance value (TH) below the peak ERLE ($ERLE_{MAX}$). Because the $ERLE_{MAX}$ may change over time as ERLE increases, the threshold may be a dynamic threshold. By way of non-limiting example, the threshold may be a threshold that is 3 dB below the peak ERLE ($ERLE_{MAX}$). If the ERLE is greater than the threshold (i.e., $ERLE_{MAX}$-TH), the adaptive filter 208 may determine that the secondary conditions are met in addition to the double talk condition being absent. As a result, the NUC may be reset (operation 330), and the adaptive filter 208 may be enabled for updating at operation 340 (e.g., by asserting the update signal UPDATE to the adaptive filter 208). The NUC may be reset in this instance to start over with the time period between the updates.

Returning to operation 325, if the control logic 214 determines that the ERLE is not greater than the threshold, NUC may update (e.g., NUC++) at operation 345 because the secondary conditions were not satisfied. At operation 350, the control logic 214 may determine if the NUC has exceeded a predetermined limit. In other words, for each iteration that double-talk is not detected but that the secondary conditions are not met, the NUC may update until the predetermined limit is exceeded.

If the predetermined limit for the NUC is not exceeded, the adaptive filter updating may be disabled at operation 355 and the primary and secondary conditions may continue to be monitored. If, however, the predetermined limit has been exceeded without the secondary conditions being met (therefore, not enabling the adaptive filter to update), the NUC may be reset (operation 360) and the threshold for the ERLE may be adjusted downward at operation 370. For example, the threshold may be decreased by a decay constant ($\Delta D$). For example, $ERLE_{MAX}$ may be decreased by the decay constant ($\Delta D$) so that the next time the secondary conditions are monitored, they will more likely be satisfied in case the system is in a relatively low performance state in need of updating without resetting the values.

As discussed above, operational acts of a flow-chart may be re-arranged and/or performed in another sequence, in parallel, or substantially concurrently. Regardless of when the operations are performed, the adaptive filter 208 may be updated if no double-talk is detected at operation 310 and the secondary conditions are satisfied (e.g., the ERLE is increasing at 320, and the ERLE is greater than the threshold (operation 325) that may be dynamically adjusted over time).

Figure 4:
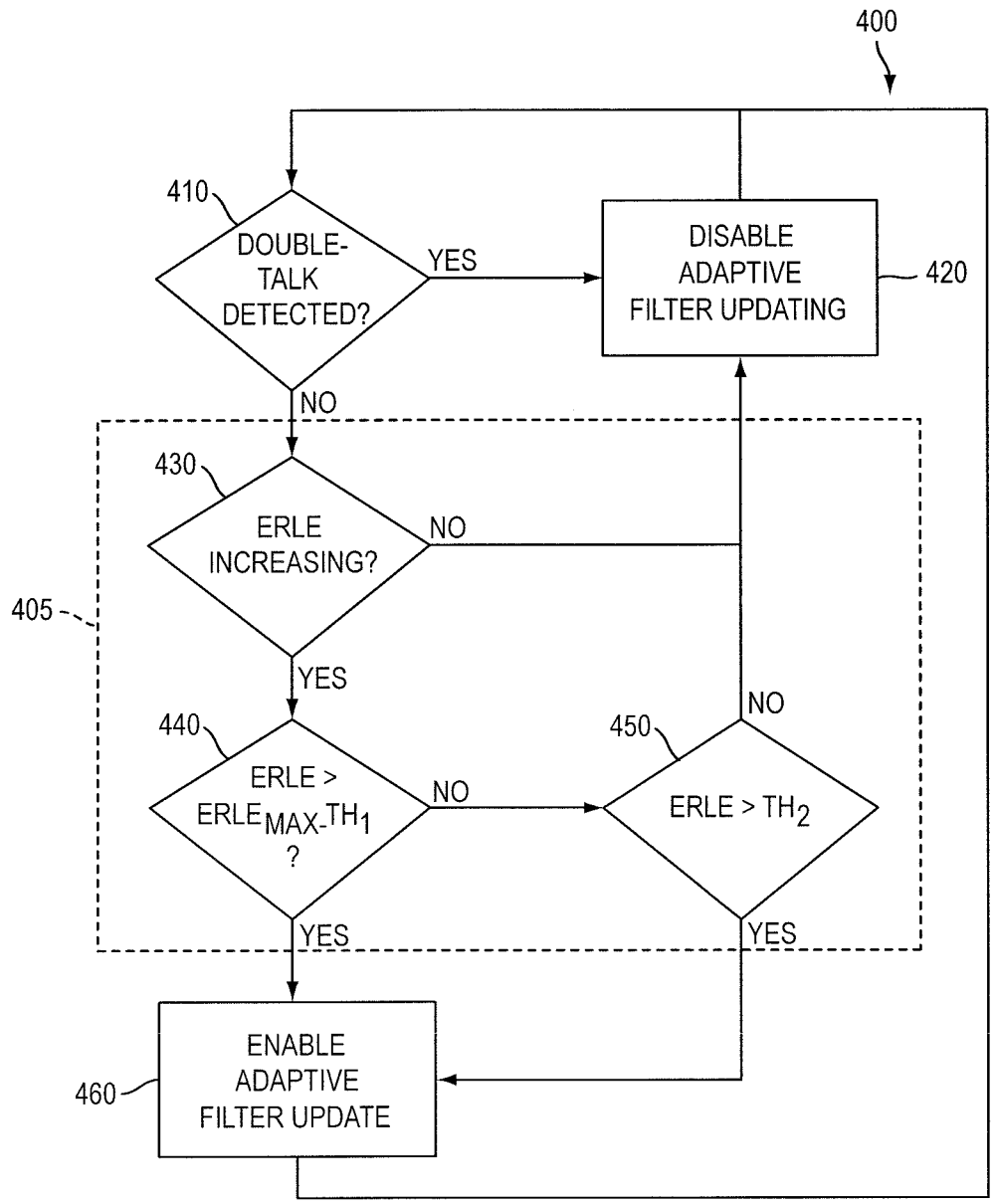
FIG. 4 is a simplified flowchart illustrating a method of operating a communication device.

FIG. 4 is a simplified flowchart 400 illustrating a method of operating a communication device 200 (FIG. 2) according to another embodiment of the disclosure. At operation 410, it may be determined if double-talk is detected. In some embodiments, the control logic 214 may receive the double-talk signal DT from the double-talk detector 206. If the double-talk detector 206 detects double-talk, the double-talk detector 206 may assert the double-talk signal DT. If the double-talk detector 206 does not detect double-talk, the double-talk detector may deassert the double-talk signal DT. If the control logic 214 determines that the double-talk detector 206 detected double-talk, the updating may be disabled for the adaptive filter 208 at operation 420. For example, the control logic 214 may deassert the update signal UPDATE, which indicates that at least one condition for enabling updating the adaptive filter 208 has not been satisfied.

Returning to operation 410, if the double-talk detector 206 does not detect double-talk, the double-talk detector 206 may indicate that double-talk is not detected by deasserting the double-talk signal DT. The control logic 214 may receive the deasserted double-talk signal DT. Even if double-talk was not detected, one or more secondary conditions 405 may still be required to be satisfied before the updating may be enabled for the adaptive filter 208.

At operation 430, the control logic 214 may determine if the ERLE is increasing. In some embodiments, the control logic 214 may determine if the ERLE is increasing by monitoring the ERLE signal from received from the ERLE measuring device 212. If the control logic 214 determines that the ERLE is not increasing, the adaptive filter 208 may not be enabled for updating at operation 420 (e.g., by deasserting the update signal UPDATE).

At operation 440, the control logic 214 may determine if the ERLE is greater than the first threshold that may be set to be a tolerance value ($TH_1$) below the peak ERLE ($ERLE_{MAX}$). By way of non-limiting example, the first threshold may be a dynamic threshold that is 3 dB below the peak ERLE ($ERLE_{MAX}$). If the ERLE is greater than the first threshold, the adaptive filter 208 may be enabled for updating at operation 460 (e.g., by asserting the update signal UPDATE).

Returning to operation 440, if the control logic 214 determines that the ERLE is not greater than the first threshold, the control logic 214 may determine if the ERLE is greater than the second predetermined threshold at operation 450. By way of non-limiting example, the second predetermined threshold may be in the range of about 18 dB to 20 dB. If the control logic 214 determines that the ERLE is not greater than the second predetermined threshold, the adaptive filter 208 may not be enabled for updating at operation 420.

Returning to operation 450, if the control logic 214 determines that the ERLE is greater than the second threshold, the adaptive filter 208 may be enabled for updating at operation 460.

As discussed above, operational acts of a flow-chart may be re-arranged and/or performed in another sequence, in parallel, or substantially concurrently. Regardless of when the operations 410, 420, 430, 440, 450, 460 are performed, the adaptive filter 208 may be updated if no double-talk is detected at operation 410 and the secondary conditions 405 are satisfied (e.g., the ERLE is increasing at 430, and the ERLE is greater than at least one of the first threshold and the second threshold, wherein the first threshold may dynamically change over time and the second threshold may be a fixed threshold).

Figure 5:
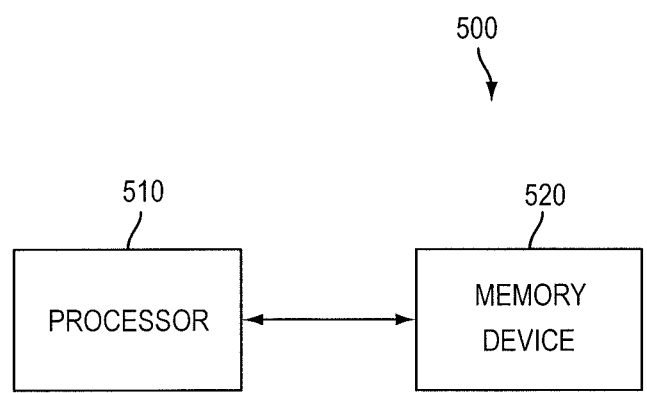
FIG. 5 is a simplified block diagram of a computing device.

FIG. 5 is a simplified block diagram of a computing device 500. The computing device 500 may include at least a processor 510 operably coupled to a memory device 520. The processor 510 may comprise any of a microcontroller, a field programmable gate array (FPGA), a central processing unit (CPU), an application-specific integrated circuit (ASIC), and other processors. The processor 510 may be configured to execute machine-readable commands stored on the memory device 520. The memory device 520 may be a computer-readable medium, comprising any of a random access memory (RAM), a read-only memory (ROM), a Flash memory, other suitable memory devices, and combinations thereof. The memory device 520 may store memory commands directed to implementing at least one of the double-talk detector 206 (FIG. 2), the adaptive filter 208 (FIG. 2), the ERLE measuring device 212 (FIG. 2), and the control logic 214 (FIG. 2). Thus, in some embodiments, at least one of the double-talk detector 206, the adaptive filter 208, the ERLE measuring device 212, and the control logic 214 may be implemented with software. In some embodiments, each of the double-talk detector 206, the adaptive filter 208, the ERLE measuring device 212, and the control logic 214 may be implemented with hardware. In some embodiments, at least one of the double-talk detector 206, the adaptive filter 208, the ERLE measuring device 212, and the control logic 214 may be implemented with software, and the rest with hardware.

Figure 6:
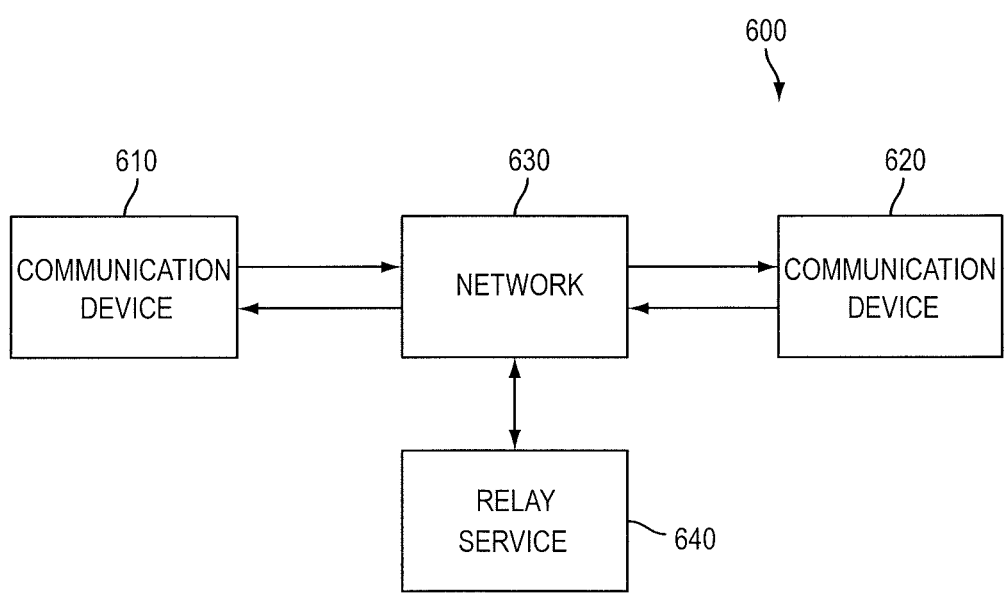
FIG. 6 is a simplified block diagram of a communication system including a plurality of communication devices.

FIG. 6 is a simplified block diagram of a communication system 600 including a plurality of communication devices 610, 620. Each of the communication devices 610, 620 may be configured to communicate with other communication devices 610, 620 through a network 630. The communication devices 610, 620 may also optionally be configured to communicate with a relay service 640 configured to provide translation services (e.g., captioning, video) through the network 630. Although FIG. 6 illustrates only two communication devices 610, 620, the communication system 600 may include more communication devices.

The network 630 may be configured to facilitate communications between the communication devices 610, 620. As non-limiting examples, the network 630 may include an internet protocol (IP) network configured to transmit public switched telephone networks (PSTNs), cellular phone networks, other similar networks, and combinations thereof. The network 630 may include a wide area network (WAN), a local area network (LAN), a personal area network (PAN), and combinations thereof. In some embodiments, the network 630 may include a cloud network. The network 630 may be configured to communicate with the communication devices 610, 620 wirelessly, through a cable, and combinations thereof. Some non-limiting examples of suitable wireless communications may include "WiFi," Bluetooth, and mobile wireless networks. Some non-limiting examples of suitable cables include fiber-optic cables, coaxial cables, traditional telephone cables, and Ethernet cables.

A first communication device 610 may be configured to generate a filtered microphone signal FILT by removing a predicted echo from a microphone signal MIC (FIG. 2), as discussed with respect to the communication device 200 of FIG. 2. In some embodiments, the first communication device 610 may be a communication device for the hearing impaired, such as, for example, a text-captioned communication device, a video communication device, an amplified audio communication device, and combinations thereof. In some embodiments, the first communication device 610 may be a communication device for hearing-capable users.

A second communication device 620 may be a communication device for a hearing-capable user, such as, for example, a conventional telephone, cellular phone, computer (e.g., personal computer, tablet, laptop, etc.), smart phone, etc. In some embodiments, however, the second communication device 620 may be another communication device for the hearing impaired. Also, in some embodiments, the second communication device 620 may be configured to remove a predicted echo from microphone signals, as discussed with respect to the communication device 200 of FIG. 2, or as discussed with respect to the conventional communication device 100 of FIG. 1. In such embodiments, the second communication device 620 may send a filtered microphone signal FILT through the network 630 to the first communication device 610. The first communication device 610 may receive the filtered microphone signal FILT as a speaker signal SPKR. Also, the first communication device 610 may send a filtered microphone signal FILT to the second communication device 620 through the network 630. The second communication device 620 may receive the filtered microphone signal FILT as its speaker signal SPKR7.

In some embodiments, the second communication device 620 may not be configured to remove a predicted echo from microphone signals. In such embodiments, the second communication device 620 may send a microphone signal MIC to the first communication device 610 through the network 630. The first communication device 610 may receive the microphone signal MIC as its speaker signal SPKR.

As previously mentioned, the communication system 600 may include more than two communication devices. In addition, more than two communication devices may participate together in a single call session. By way of non-limiting example, three or more communication devices may participate in a call session. The speaker signal SPKR of each of the communication devices 610, 620 may include a combination of microphone MIC or filtered microphone signals FILT from the other communication devices 610, 620. In some embodiments, the speaker signal SPKR may be a sum of the microphone MIC or filtered microphone signals FILT from the other communication devices 610, 620.

The relay service 640 may be configured to provide translation services for hearing-impaired users of the communication devices 610, 620. In some embodiments, relay service 640 may act as a router for voice signal between the communication devices 610, 620. In some embodiments, the communication devices 610, 620 may be coupled more directly through the network 630 such that at least one of the communication devices 610, 620 may route the voice signal (s) to the relay service 640.

By way of non-limiting example, if the first communication device 610 is a text-captioned communication device, the relay service 640 may receive the speaker signal SPKR from one of the first communication device 610 and the second communication device 620 through the network 630. The relay service 640 may convert verbal utterances from the speaker signal SPKR to a text transcription of at least one side of the conversation. The relay service 640 may send the text transcription to the first communication device 610 through the network 630. In some embodiments, a call assistant at the relay service 640 may transcribe the verbal utterances from the speaker signal SPKR. The call assistant may re-speak the verbal utterances into a speech recognition device, which may convert the re-spoken verbal utterances into text. In some embodiments, the verbal utterances from the speaker signal SPKR may be input directly into the speech recognition device, which may convert the verbal utterances into text without a call assistant.

Also by way of non-limiting example, if the first communication device 610 is a video communication device, the relay service 640 may be a video relay service (VRS). The relay service 640 may receive video from the first communication device 610 through the network 630. The video from the first communication device 610 may be, for example, a video of a hearing impaired user communicating with non-verbal expressions, such as, for example, American Sign Language (ASL). A call assistant at the relay service 640 may translate the non-verbal expressions of the hearing-impaired user to speech, and the relay service 640 may send the speech to the second communication device 620 through the network 630. In addition, the relay service 640 may receive the MIC/FILT signal from the second communication device 620 through the network 630, and the call attendant at the relay service 640 may translate verbal utterances from the MIC/FILT signal to non-verbal expressions. A video of the call attendant's non-verbal expressions may be sent through the network to the first communication device 610.

It is contemplated within the scope of the disclosure that the electronic circuit 216 (FIG. 2) may be used in the communication devices 610, 620 to remove an echo of the filtered microphone signal FILT created in the speaker signal SPKR at the second communication device 620. A microphone 204 and speaker 202 (FIG. 2) of the second communication device 620 may be at least partially acoustically coupled. As a result, the speaker signal SPKR at the first communication device 610 may include an echo of the filtered microphone signal FILT. The electronic circuit 216 may be configured similarly to the configuration of FIG. 2, except that the speaker signal SPKR signal and the microphone signal MIC may be swapped, and the adaptive filter 208 configured to output a filtered speaker signal instead of a filtered microphone signal FILT.

It is further contemplated within the scope of the disclosure that the communication devices 610, 620 may include a first electrical circuit, analogous to the electronic circuit 216, that may be used to filter the microphone signal MIC, and a second electronic circuit, analogous to the electronic circuit 216, that may be used to filter the speaker signal SPKR. In such embodiments, the first and second electronic circuits may share a single double-talk detector 206 (FIG. 2), or each of the electronic circuits may include its own double-talk detector 206.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to reduce echo in a communication device, the method comprising:
    measuring an echo return loss enhancement (ERLE) of an adaptive filter;
    comparing the ERLE to a ERLE threshold; and
    in response to the ERLE being less than the ERLE threshold and a double talk condition indicating double talk is not occurring, decreasing the ERLE threshold by a decay constant less than the ERLE threshold.

2. The method of claim 1, wherein decreasing the ERLE threshold is in response to the ERLE being less than the ERLE threshold and a particular time elapsing without updating coefficients of the adaptive filter.

3. The method of claim 1, further comprising filtering a signal using the adaptive filter to remove an echo signal included in the signal.

4. The method of claim 3, wherein the filtered signal is configured to be provided to a speaker included in the communication device.

5. The method of claim 3, wherein the signal is generated by a microphone included in the communication device.

6. The method of claim 3, wherein the ERLE of the adaptive filter is based on the signal and an output of the adaptive filter.

7. The method of claim 3, wherein the echo signal is an acoustic echo signal.

8. The method of claim 3, wherein the echo signal is a line echo signal.

9. The method of claim 3, wherein decreasing the ERLE threshold is in further response to a particular time elapsing without updating coefficients of the adaptive filter.

10. The method of claim 1, wherein in response to the ERLE being more than the ERLE threshold, coefficients of the adaptive filter are updated.

11. The method of claim 1, further comprising determining a trend of the echo return loss enhancement of the adaptive filter, wherein decreasing the ERLE threshold by the decay constant is further in response to the trend of the ERLE indicating that the ERLE is increasing.

12. The method of claim 11, wherein determining the trend of the ERLE includes comparing a current ERLE measurement with one or more previous ERLE measurements.

13. The method of claim 1, further comprising detecting the double talk condition for a first signal and a second signal of the communication device, wherein the double talk condition indicates that the double talk is not occurring.

14. The method of claim 1, wherein in response to the ERLE being less than the ERLE threshold, the method further comprising disabling updating of coefficients of the adaptive filter.

15. At least one non-transitory computer readable media configured to store one or more instructions that when executed by at least one computing system performs the method of claim 1.

16. A method to reduce echo in a communication device, the method comprising:
    comparing an echo return loss enhancement (ERLE) of an adaptive filter to a ERLE threshold;
    in response to the ERLE being more than the ERLE threshold, enabling updating of coefficients of the adaptive filter instead of decreasing the ERLE threshold by a decay constant less than the ERLE threshold when the ERLE is less than the ERLE threshold; and
    after enabling updating of the coefficients, disabling updating of the coefficients in response to either double talk in the communication device or a trend of the ERLE indicating that the ERLE is decreasing.

17. The method of claim 16, wherein enabling updating of the coefficients occurs in further response to a lack of double talk in the communication device and the trend of the ERLE indicating that the ERLE is increasing.

18. At least one non-transitory computer readable media configured to store one or more instructions that when executed by at least one computing system performs the method of claim 16.

19. A method to reduce echo in a communication device, the method comprising:
    determining a trend of an echo return loss enhancement (ERLE) of an adaptive filter;
    detecting a double talk condition for the communication device;
    measuring the ERLE of the adaptive filter;
    comparing the ERLE to a ERLE threshold; and
    in response to the double talk condition indicating double talk is not occurring, the ERLE being more than the ERLE threshold, and the trend of the ERLE indicating that the ERLE is increasing, updating coefficients of the adaptive filter instead of decreasing the ERLE threshold by a decay constant less than the ERLE threshold.

20. At least one non-transitory computer readable media configured to store one or more instructions that when executed by at least one computing system performs the method of claim 19.

* * * * *